United States Patent [19]

Agro et al.

[11] Patent Number: 5,533,776
[45] Date of Patent: Jul. 9, 1996

[54] SUN VISOR FOR MOTOR VEHICLES

[75] Inventors: Marc Agro, Saint Avold, France; Wolfgang Auer, Nagold, Germany; Gerard Hilt, Henriville, France; Henning Peters, Pfalzgrafenweiler; Sabine Rust, Aidlingen, both of Germany

[73] Assignee: Gebr. Happich GmbH, Germany

[21] Appl. No.: 295,618

[22] Filed: Aug. 25, 1994

[30] Foreign Application Priority Data

Aug. 27, 1993 [DE] Germany ............... 43 28 890.1

[51] Int. Cl.$^6$ .................................................. B60R 1/12
[52] U.S. Cl. .................... 296/97.9; 296/97.12; 296/97.5
[58] Field of Search ................................ 296/97.1, 97.5, 296/97.8, 97.9, 97.11, 97.12, 97.13; 362/83.1, 141

[56] References Cited

U.S. PATENT DOCUMENTS

| | | | |
|---|---|---|---|
| 4,363,511 | 12/1982 | Viertel et al. ............... | 296/97.5 |
| 4,390,202 | 6/1983 | Flowerday et al. ............... | 296/97.13 |
| 4,582,356 | 4/1986 | Kaiser et al. ............... | 296/97.11 |
| 5,004,288 | 4/1991 | Viertel et al. ............... | 296/97.8 X |
| 5,188,446 | 2/1993 | Miller ............... | 296/97.5 X |
| 5,299,106 | 3/1994 | Buchheit et al. ............... | 296/97.13 X |
| 5,320,399 | 6/1994 | White et al. ............... | 296/97.12 |
| 5,365,416 | 11/1994 | Peterson ............... | 296/97.8 X |

FOREIGN PATENT DOCUMENTS

| | | | |
|---|---|---|---|
| 3916560 | 11/1990 | Germany ............... | 296/97.5 |
| 5286362 | 11/1993 | Japan ............... | 296/97.11 |
| 5286363 | 11/1993 | Japan ............... | 296/97.11 |

*Primary Examiner*—Joseph D. Pape
*Attorney, Agent, or Firm*—Ostrolenk, Faber, Gerb & Soffen

[57] ABSTRACT

The sun visor has a sun-visor body which is swingable around and longitudinally displaceable on a shaft. A detent device prevents unintended axial displacement. There are two contact springs which are insulated from each other and are connected with electric wires leading to an illuminating device arranged in the sun-visor body. One of the contact springs snaps into an indentation on the contact sleeve and the other one snaps into an indentation in the shaft. The shaft (connected at one end to the contact sleeve), consists of a metal tube serving as ground connector through which an electric conductor is conducted. The contact sleeve is by an insulating sleeve. The detent device serves not only for the detent engagement of the sun-visor body but also to supply current to the illuminating device.

12 Claims, 3 Drawing Sheets

SUN VISOR FOR MOTOR VEHICLES

BACKGROUND OF THE INVENTION

The present invention relates to a sun visor for motor vehicles, having a sun-visor body which is swingable around a shaft and slides longitudinally on said shaft from its normal position to a second position of use; a sliding part mounted to enable rotation but secured on the shaft so that the axial position on the sliding member is not displaced. The sliding member positioned to allow for rotation is seated in a tubular hollow body which is embedded in the longitudinal edge of the sun-visor body. The tubular hollow body is closed at its ends by plugs. One side has a guide opening for the passage of the shaft and the other has a detent device to prevent unintended axial displacement of the sun-visor body from its normal position.

A sun visor of this type is known from EP 0 231 440 B1. That patent, however, contains no indication that the sun visor could be equipped with an illuminating device in order, for instance, to be able to use a mirror arranged on the sun-visor body even in the dark. On the other hand, there are known from public use sun visors of the type in question which have an illuminating device and a mirror. To supply current for the illuminating device, use is made of the teaching contained in German 27 03 447 A1. In that case, the current is fed via the outer support, through its housing, which is provided with at least one contact element which is connected to the electric system of the car and contacts the shaft of the outer support to at least the current feed wire for the source of light. Although the sun visor having an illuminating device which uses the above method to provide a supply of current has proven excellent in actual use, there is a need for a sun visor having an illuminating device to which current is provided via the main support rather than via the outer support.

The feeding of current for the illuminating device of a sun visor via the main support is known from German 29 11 464 A1. However, the measures described in that patent are not suitable for a sun visor of the above-mentioned type in which the sun-visor body is swingable around a shaft and slides on said shaft but, rather, only for sun visors in which the sun-visor body is seated in a non-displaceable manner on the sun-visor shaft.

SUMMARY OF THE INVENTION

The object of the present invention is to develop a sun visor of the aforementioned type equipped with an illuminating device, to which a supply of current is provided over the main support and requires the use of a few, inexpensive means.

To achieve this object, according to the invention, a sun visor having features of the present invention comprises an electrically conductive shaft which has a longitudinal leg and an angled leg. A sun-visor body is mounted on the shaft along the longitudinal leg of the shaft to enable the sun visor body to rotate on the longitudinal leg and to move longitudinally with respect to the shaft between a first position and a second position. There is at least one illuminating means mounted on the sun-visor body. First conductive means, disposed within a bore of the shaft and electrically insulated from the shaft, extends from the first end of the angled leg to the first end of the longitudinal leg. Holding means is connected to the sun visor body at an end adjacent to the first end of the longitudinal leg of the shaft. Contact and detent means are supported by the holding means in order to establish electrical contact with the first electrically conductive means and the longitudinal leg of the shaft and to secure the shaft from longitudinal movement when the sun visor body is in the first position. Second electrically conductive means is provided to connect the contact and detent means to the illuminating device.

The contact and detent means includes contact springs insulated from each other and connected to electric wires leading to an illuminating device arranged in the sun-visor body. One of the contact springs snaps into an indentation in a contact sleeve and the other contact spring snaps into an indentation developed at the end of the shaft. In each case, a protrusion at the end of the contact spring fits into the indentation. The shaft consists of a metal tube serving as ground conductor and an insulated electric wire is passed through the shaft. The electric wire is connected to the contact sleeve, which has an indentation and protrudes beyond the end of the shaft on one part and another part which is fastened to the end of the shaft with the interpositioning of an insulating sleeve.

While highly reliable, it is also extremely inexpensive to supply electric current to the illuminating means placed in the sun-visor body. This is due to the double function of the contact and detent means which act to conduct electric current and secure the position of the sun-visor body. The contact springs can consist of brass blade which are provided at one end with a protrusion for engagement in the corresponding indentation and are connected at the other end to the electric wires, preferably by resistance welding. Current to the illuminating means is interrupted as soon as the sun-visor body is brought into the second position of use. This second position of use, however, is as a rule only required when the sun-visor body is in front of a side window. Because, the illuminating means is not required in this position of the sun-visor body, the interruption of the supply of current does not constitute a disadvantage. When the sun-visor body is in its normal position in front of the windshield, the feeding of current for the illuminating means is always assured.

In accordance with a preferred further development of the invention, the contact and detent means are held by a holding means which consists of a plug. In this way, the assembling of the sun visor is simplified since the plug can thus be developed in particularly simple manner as a plastic injection molding in one piece with an insert which stiffens the sun-visor body, without insertion parts which interfere with the handling.

It can furthermore be provided that the shaft, which is formed of a metal tube, have plastic injected around it, with the exception of its end regions. In this way, the stability of the shaft is increased and no special surface treatment of it is necessary.

Other features and advantages of the present invention will become apparent from the following description of the invention which refers to the accompanying drawings.

BRIEF DESCRIPTION OF THE DRAWING(S)

One embodiment of the invention will be described below with reference to the drawing, in which.

DETAILED DESCRIPTION OF EMBODIMENTS OF THE INVENTION

Figure 1:
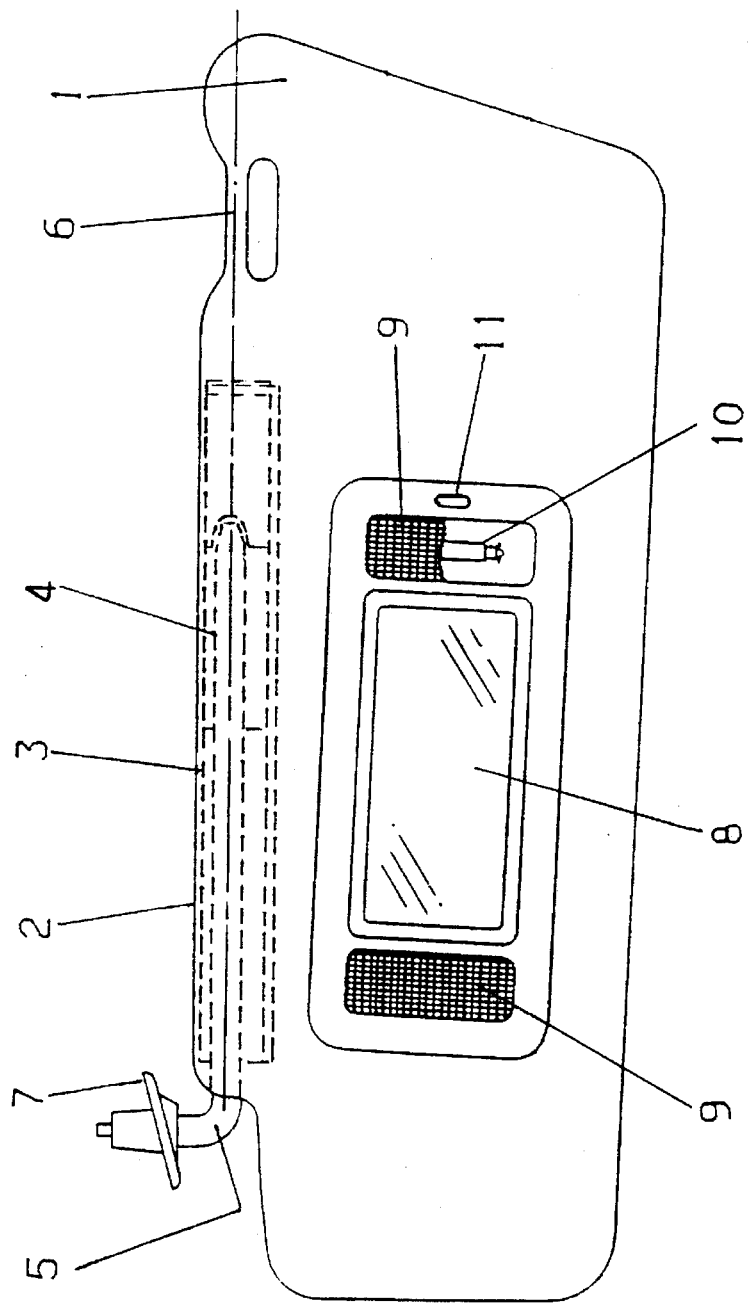
FIG. 1 is an overall view of the sun visor.
Figure 2:
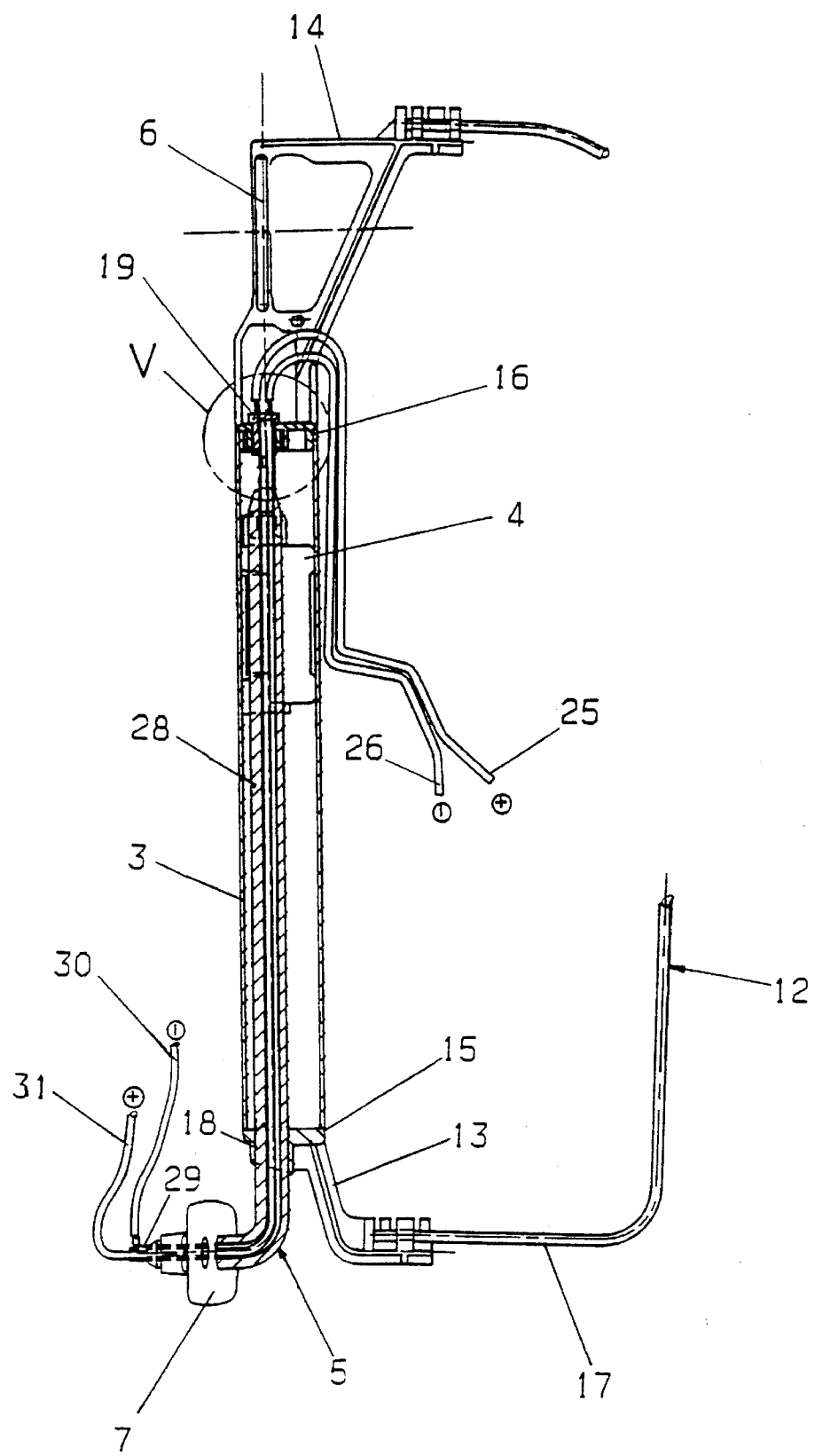
FIG. 2 shows an insert for the sun visor on a larger scale than FIG. 1.

Referring to the drawings and, in particular, to FIG. 1, the sun visor consists of a sun-visor body 1 which, in the region of an upper longitudinal edge 2 bears a tubular hollow body 3 inserted therein, and a sliding member 4 which serves as support for a shaft 5, the sliding member 4 being secured within the tubular body 3 and slidable over the shaft 5. The sun visor furthermore has a support pin 6 (as best seen in FIG. 2) for engagement in an outer support (not shown). The shaft 5 is approximately an L-shape, the long arm of which is received by the sliding member 4 and the short arm by a swivel-mounting housing 7. The sun-visor body 1 is customarily arranged on the long arm of the shaft 5 in the position shown in FIG. 1 (normal position). In order that the driver and front-seat passenger of the vehicle can better protect themselves from incident sun rays or other action of light, the sun-visor body 1 is displaceable on the long arm of the shaft 5. The displaceable arrangement of the sun-visor body 1 on the shaft 5 is of particular advantage when the sun-visor body 1 is in a position swung in front of a front side window of a vehicle.

Within the sun-visor body 1, in a recess provided for this purpose, there is inserted an assembly group which comprises a make-up mirror 8 and an illuminating device which includes sources of light, such as tubular bulbs 10 (only one of which is shown) arranged behind illuminating windows 9 and a switch 11. The electric current supply for the illuminating device, which can be fed from the general electrical system of the vehicle, will be explained with reference to FIGS. 2 and 3.

FIG. 2 shows first of all an insert 12 for stiffening the sun-visor body 1, which is generally made of foam plastic and bears the insert 12 embedded therein. The insert 12 consists of two plastic elements 13 and 14, which are developed as one piece with plugs 15 and 16 respectively. Between the plastic elements 13, 14 the hollow body 3 is supported by the plugs 15, 16. Furthermore, the plastic elements 13, 14 are connected to each other by a wire bow 17.

Figure 3:
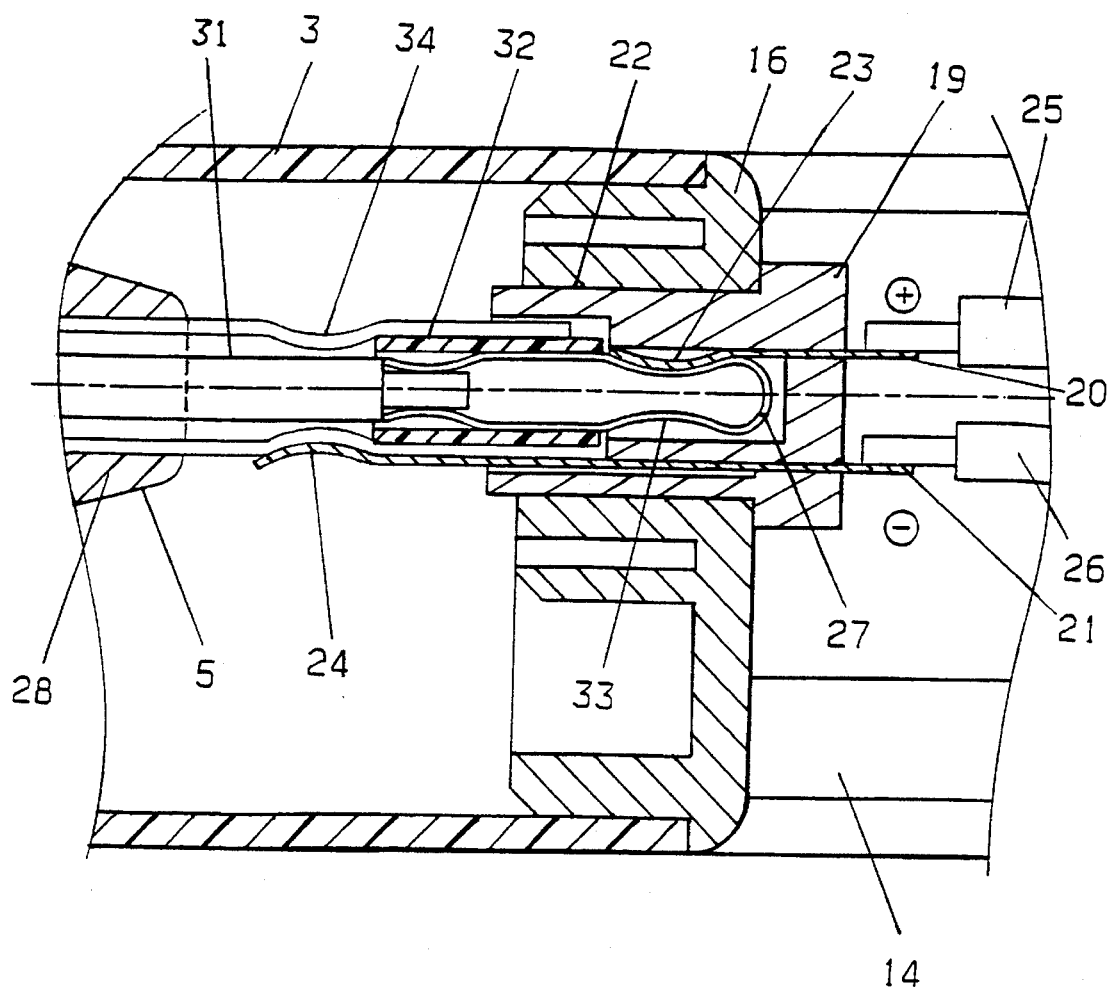
FIG. 3 shows a detail V according to FIG. 2 on an even larger scale.

The plug 15 has a guide opening 18 for the passage of the shaft 5, while the plug 16 is provided with detent and contacting means. Referring to FIG. 3, the detent and contacting means consist of two contact springs 20, 21 which are borne by a contact holder 19 and can be developed as flat brass blades. The contact holder 19 is inserted into an opening 22 in the plug 16 and held fast by detent connection, that is, by being snapped into opening 22. The contact springs 20 and 21 extend on both ends out of the contact holder 19, on which they are held fast by extrusion-coating. They have in each case an electric wire 25, 26 extending to the illuminating device welded to the ends extending away from the hollow body 3 and an indentation 23 and 24 on the region of the other ends facing the hollow body 3.

The contact springs 20, 21 cooperate with a contact sleeve 27 and with the shaft 5. The latter consists of a steel tube which bears, except on its end regions, a plastic body 28 formed by extrusion coating. The shaft 5 serves as ground conductor for the illuminating device and, as seen in FIG. 2, bears, at its free end, a contact lug 29 for the connecting of a ground wire 30. An insulated connecting line 31 which is live with respect to ground is passed through the shaft 5 and on a bare end bears the contact sleeve 27 which is connected to the electrical current and which, in the same way as the contact springs 20, 21, should consist of brass. The contact sleeve 27 is surrounded by an insulating sleeve 32 and is fastened, together with the latter, for instance by force-fitting, in the end of the shaft which is located within the sun-visor body 1. The indentation 23 on the shorter contact spring 20 can snap into an annular trough 33 in the contact sleeve 27, and the indentation on the longer contact spring 21 can snap into an annular trough 34 in the shaft 5 when the sun-visor body 1 is moved from the second position of use, 10, when the sun-visor body 1 is in front of a sidewindow, into the normal position, i.e., when the sun-visor body 1 is in front of the windshield". In this way, the detachable detent engagement of the sun-visor body 1 in the normal position is assured, as well as the supply of electric current to the illuminating device.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sun visor for motor vehicles, comprising:

(a) an electrically conductive shaft having a longitudinal leg and an angled leg, each leg having respective first and second ends, the shaft having an internal bore which extends from the first end of the angled leg to the second end of the longitudinal leg;

(b) a sun visor body;

(c) means for mounting the sun visor body on the shaft along the longitudinal leg thereof such as to enable the sun visor body to rotate on the longitudinal leg and to move longitudinally with respect to the shaft between a first position and a second position;

(d) at least one illuminating means mounted on the sun-visor body;

(e) first electrically conductive means disposed within the bore of the shaft such as to be electrically insulated from the shaft and extending from the second end of the angled leg to the first end of the longitudinal leg;

(f) holding means connected to the sun visor body at an end thereof adjacent to the first end of the longitudinal leg of the shaft;

(g) contact and detent means supported by the holding means for establishing electrical contact with the first electrically conducting means and the longitudinal leg of the shaft and for securing the shaft from longitudinal movement when the sun visor body is in the first position; and (h) second electrically conductive means for electrically connecting the contact and detent means to the illuminating device.

2. A sun-visor according to claim 1, wherein the contact and detent means includes at least one contact spring extending longitudinally from the holding means toward the longitudinal leg of the shaft, and the contact spring and the shaft have respective securing means for cooperating with one another to secure the shaft from longitudinal movement.

3. A sun-visor according to claim 1, further including third electrically conductive means connected to the first electrically conductive means and wherein the contact and detent means includes first and second contact springs extending longitudinally from the holding means toward the longitudinal leg of the shaft, the first contact spring and the third electrically conductive means having respective securing means for cooperating with one another to secure the shaft from longitudinal movement when the sun visor body is in the first position thereof and the second contact spring and the shaft having respective securing means for cooperating with one another to secure the shaft from longitudinal movement when the sun visor body is in the first position thereof.

4. A sun-visor according to claim 3, wherein the securing means on the shaft and the securing means on the third electrically conductive means include respective indentations and the securing means on the first and second contact springs include corresponding protrusions.

5. A sun-visor according to claim 1, wherein the means for mounting the sun-visor body includes a tubular hollow body disposed around the shaft and secured to the sun-visor body, the holding means being connected to said tubular hollow body.

6. A sun-visor according to claim 5, wherein the means for mounting further includes a sliding member having a longitudinal passageway for receiving the longitudinal leg of the shaft so that said sliding member may slide longitudinally with respect to the longitudinal leg of the shaft.

7. A sun-visor according to claim 6, wherein the holding means comprises a plug in one end of the tubular hollow body, the plug having a longitudinal bore therethrough, the contact and detent means being received within the bore.

8. A sun-visor according to claim 1, wherein the illuminating means is a device with tubular bulbs arranged behind an illuminating window and has a switch.

9. A sun-visor according to claim 1, wherein the first electrically conductive means is an insulated wire.

10. A sun-visor according to claim 1, wherein the second electrically conductive means is a contact sleeve connected to and extending longitudinally from the shaft at the second end of the longitudinal leg.

11. A sun-visor, comprising:
(a) an L-shaped electrically conductive shaft having a longitudinal leg and an angled leg, the shaft having an internal bore which extends from the first end of the angled leg to the second end of the longitudinal leg, the longitudinal leg of the shaft having an indentation adjacent to the first end thereof;
(b) a sun visor body;
(c) a tubular hollow body disposed around the longitudinal leg of the shaft and secured to the sun-visor body, the tubular hollow body having plugs on both ends;
(d) a sliding member disposed within the tubular hollow-body, the sliding member having a longitudinal passageway through which the longitudinal leg of the shaft passes, so that the sliding member may rotate about the longitudinal leg and slide longitudinally within the tubular hollow body with regard to the longitudinal leg of the shaft;
(e) at least one illuminating device mounted on the sun-visor body;
(f) an electrical wire insulated from the shaft extending from the first end of the angled leg to the second end of the longitudinal leg of the shaft;
(g) one of the plugs of the tubular body being located adjacent to the longitudinal end of the shaft, the one plug having a longitudinal bore therethrough;
(h) a contact sleeve connected to and extending from the end of the electrical wire at the first end of the longitudinal leg of the shaft;
(i) two contact springs having respective first and second ends supported by the one plug and extending longitudinally from the one plug toward the first end of the longitudinal leg and the contact sleeve, each spring having a protrusion on its first end, the protrusion on one spring end corresponding in shape to the indentation at the first end of the longitudinal leg of the shaft, the protrusion on the other spring end corresponding in shape to an indentation on the contact sleeve; and
(j) wire means for electrically connecting the second ends of the contact springs to the illuminating device.

12. A sun-visor according to claim 11, wherein the shaft has a plastic coating thereon except in the region adjacent to the first ends of the angled and longitudinal legs.

* * * * *